US011904569B2

(12) United States Patent
Schalk et al.

(10) Patent No.: US 11,904,569 B2
(45) Date of Patent: Feb. 20, 2024

(54) COILING DEVICE AND CUSHION COILING SYSTEM

(71) Applicant: Sprick GmbH Bielefelder Papier-und Wellpappenwerke & Co., Bielefeld (DE)

(72) Inventors: Bastian Schalk, Detmold (DE); Marco Schwarberg, Melle (DE); Saskia Lange, Detmold (DE)

(73) Assignee: Sprick GmbH Bielefelder Papier-Und Wellpappenwerke & Co., Bielefeld (DE)

( * ) Notice: Subject to any disclaimer, the term of this patent is extended or adjusted under 35 U.S.C. 154(b) by 437 days.

(21) Appl. No.: 17/041,817

(22) PCT Filed: Mar. 26, 2019

(86) PCT No.: PCT/EP2019/057553
§ 371 (c)(1),
(2) Date: Sep. 25, 2020

(87) PCT Pub. No.: WO2019/185614
PCT Pub. Date: Oct. 3, 2019

(65) Prior Publication Data

US 2021/0086466 A1 Mar. 25, 2021

(30) Foreign Application Priority Data

Mar. 26, 2018 (DE) ......................... 102018107156.6

(51) Int. Cl.
*B31D 5/00* (2017.01)
*B65B 55/20* (2006.01)

(52) U.S. Cl.
CPC ............ *B31D 5/0047* (2013.01); *B65B 55/20* (2013.01); *B31D 2205/0023* (2013.01);
(Continued)

(58) Field of Classification Search
CPC ................................ B31D 5/00; B31D 5/0047
See application file for complete search history.

(56) References Cited

U.S. PATENT DOCUMENTS 5,383,837 A * 1/1995 Watts .................... B65D 81/09 493/967
6,626,813 B1 9/2003 Ratzel et al.
(Continued)

FOREIGN PATENT DOCUMENTS

DE 10 2008 039 617 A1 3/2010
EP 2204325 A1 7/2010
(Continued)

OTHER PUBLICATIONS

Internation Search Report dated Aug. 20, 2019, Application No. PCT/EP2019/057553.
(Continued)

*Primary Examiner* — Praachi M Pathak
(74) *Attorney, Agent, or Firm* — Banner & Witcoff Ltd.

(57) ABSTRACT

A Coiling device for spirally rolling-up a three-dimensional cushioning material made by a cushion forming device from a web-type source material (e.g. a roll or a Leporello-stack) of paper, can include a reel having at least two deflectors, and having a rotational axis extending in vertical direction. The deflectors can be a mandrel, hook, deflector edge, or the like.

20 Claims, 3 Drawing Sheets

Figure 1:
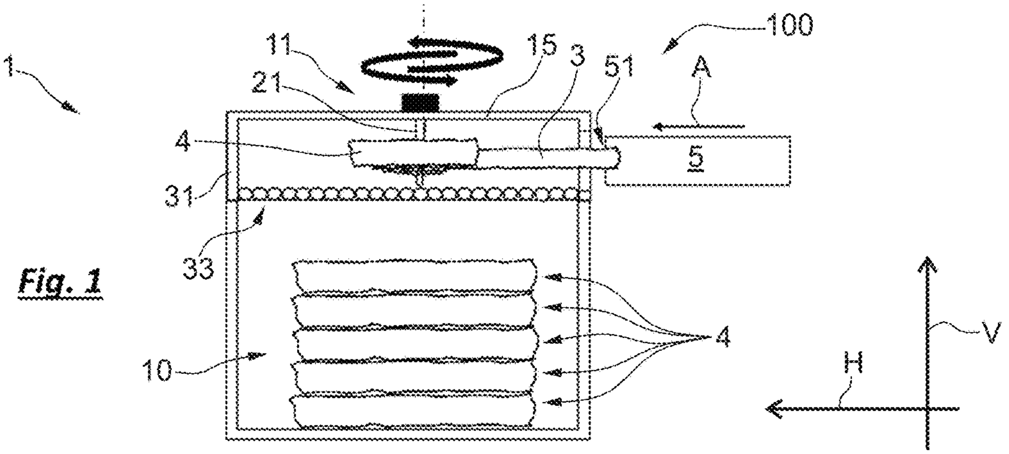

(52) U.S. Cl.
CPC ................ *B31D 2205/0047* (2013.01); *B31D 2205/0082* (2013.01); *B31D 2205/0088* (2013.01)

(56) References Cited

U.S. PATENT DOCUMENTS

| | | | | |
|---|---|---|---|---|
| 7,788,884 | B2 * | 9/2010 | Cheich ................. | B31D 5/0047 53/238 |
| 2002/0007618 | A1 | 1/2002 | Armington et al. | |
| 2005/0065009 | A1 | 3/2005 | Lu et al. | |
| 2008/0051277 | A1 * | 2/2008 | Slovencik ............ | B31D 5/0052 493/464 |
| 2008/0153685 | A1 | 6/2008 | Cheich et al. | |
| 2010/0293898 | A1 | 11/2010 | Cheich et al. | |
| 2012/0165172 | A1 * | 6/2012 | Wetsch ................ | B65H 35/008 493/464 |
| 2016/0082685 | A1 * | 3/2016 | Chan .................... | B31D 5/0043 493/464 |
| 2018/0304571 | A1 | 10/2018 | Lammers et al. | |
| 2020/0070460 | A1 * | 3/2020 | Schalk ................. | B31D 5/0047 |

FOREIGN PATENT DOCUMENTS

| | | | |
|---|---|---|---|
| EP | 2 711 168 | B1 | 11/2016 |
| WO | 99/21702 | A2 | 5/1999 |
| WO | 2017/070670 | A1 | 4/2017 |

OTHER PUBLICATIONS

German action dated Nov. 15, 2018, Application No. 10 2018 107 156.6.

* cited by examiner

COILING DEVICE AND CUSHION COILING SYSTEM

CROSS REFERENCE TO RELATED APPLICATIONS

This patent application is a United States National Stage Application of International Application No. PCT/EP2019/057553, filed Mar. 26, 2019, which claims priority to German Patent Application No. 102018107156.6, filed Mar. 26, 2018, each of which is incorporated herein by reference in its entirety.

BACKGROUND

The disclosure relates to a coiling device for spirally rolling-up a three-dimensional cushioning material made by a cushion forming device from a web-type source material, in particular a roll or a Leporello-stack, for example of paper. Furthermore, the disclosure relates to a cushion coiling system comprising a coiling device as well as a cushion forming device for making the cushioning material from a web-type source material.

Machines for making a three-dimensional cushioning material from a web-type source material, for example paper, are known for example from DE 10 2008 039 617 A1 or EP 2 711 168 B1.

The cushion forming machine according to DE 10 2008 039 617 A1 is provided with a hollow paper web roll as the source material, from the inner roll side of which the paper web is drawn in by a motorized conveying- and forming-unit in a spiral-hose shape. The conveying- and forming wheels of the forming device insert a mountain-valley-profile into the spiral paper web-hose during the conveying of the paper web through their engagement area. The forming wheels thereby create a stable, three-dimensional, hose-like cushioning material.

EP 2 711 168 B1 describes a cushion forming machine having a source material that can be rolled-up or which can be provided in the form of a Leporello-stack. The paper web is fed to the forming machine from the upper side of the stack or from the outside of the roll, respectively. The paper web has two longitudinal edges extending in the web direction and a middle area therebetween which extends in parallel to the longitudinal edges. The right and the left longitudinal edges are folded or rolled at least partially over the middle area so that a hollow cushioning-space is created extending in the web direction. At least a part of the middle area is fixed along a deformation section extending in the web direction. For forming and fixing the web section, a pair of embossing wheels is utilized which impresses a mountain-valley-profile into the middle area and the parts of the side edges above it to attach them to one another. Downstream of the pair of wheels, a cutter may be provided which separates individual cushioning pillows from the three-dimensional cushioning hose.

With these established cushion forming machines, three-dimensional cushioning material hoses or pillows of different length can be made. For some applications it is desired to cover large areas with cushioning material. For example, it can be desired to completely or partially cover the floor surface of a container, for example a cardboard box, a box, a wire basket or the like, in order to transport heavy or delicate material resting on the cushioning material. To this effect, several cushioning pillows can for example be inserted parallel next to one another into the cardboard box to cover its floor surface. It is also conceivable to insert cushioning pillows loosely into the cardboard box to cover its floor surface. Alternatively, one long cushioning pillow can be created that is bound to a spiral worm to cover the bottom of the cardboard box. The application of such cushioning worms reduces the number of cushioning units to be inserted and therefore the number of actions to be performed by packaging personnel and therefore also the duration of the packing procedure which may result in a larger throughput for the same expenditure of time.

From WO 99/21702 A2 a cushioning forming machine is known in combination with a coiling device. The cushion forming device comprises a conversion device for converting a web-type source material a three-dimensional strip of cushioning material having hose- or pillow-like areas and an embossed middle area. The cushion conversion device dispenses the strip of cushioning material at a dispensing opening in a horizontal direction. At the exit of the cushioning material conversion device, a beak-shaped guide is provided which guides the strip of cushioning material towards a coiling device in horizontal direction. The cushion device is provided with a motor-driven shaft a rotary disk from which two parallel, cylindrical rods extend. The cylindrical rods are, like the shaft, horizontal and have a horizontal orientation across from the horizontal conveying part of the strip of cushioning material. Through the guide, the strip of cushioning material is guided between the rods. When the rotary disk is set into rotating motion, the rods take along the strip of cushioning material during their rotational movement and roll-up the strip of cushioning material to a spiral cushioning material worm. In order to provide space for the radial extension of the cushioning material worm, the beak-like guide is increasingly widened and stays in a tangential contact with the cushioning material worm. When the cushioning material worm has reached a desired size it can be separated from the source material and removed from the coiling device. It has been shown that such a coiling device does practically not provide any time savings in comparison to fast cushioning forming device such as a described above and no increase in efficiency of the packaging procedure can be achieved. This is particularly due to the complicated handling of the coiling device. When removing a cushioning material worm from the rods, the inner windings which are firmly rolled around the rods can stick to them when an operator pulls the outer windings. In such a case, the operator pulls the outer windings apart from the inner windings such that the worm unwinds. The coiling device is only able to roll-up one single worm which generally does not have an optimal adaption in relation to the surface to be covered, as boxes generally a have a quadratic or rectangular rather than circular floor surface. The cushioning material may be shaped by the operator or multiple worms have to be placed next to one another onto the floor surface of the box. Subsequently, the operator must wait for the coiling machine after placing one cushioning material worm into the box until the cushioning machine has rolled-up the next worm. The operator could insert the known established longitudinal cushioning material pillows into the box more quickly which are produced at a high velocity by the above mentioned cushioning forming devices of the applicant. Furthermore, it has been shown in practical application that, due to the common workplace safety regulations, packing personnel may only approach the coiling machine when it is in a safe, deactivated state, because otherwise it would pose a substantial risk of injury due to the movable parts, particularly the scissor-like guide and the quickly rotation rods. For a practical application of the coiling device would thus have to be turned on and off all the time so that the amount of produces cushioning volume per time is further reduced.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 3A:
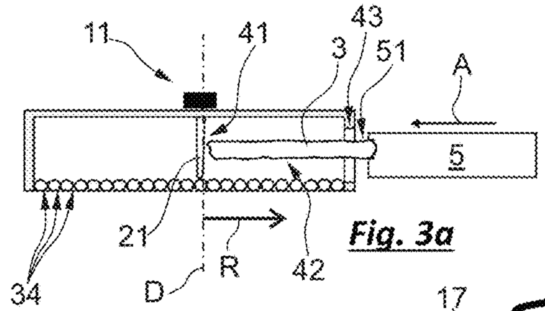
Figure 3B:
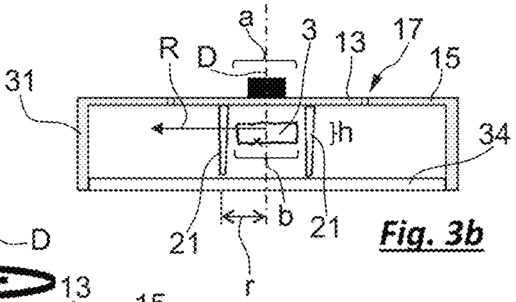
Figure 2:
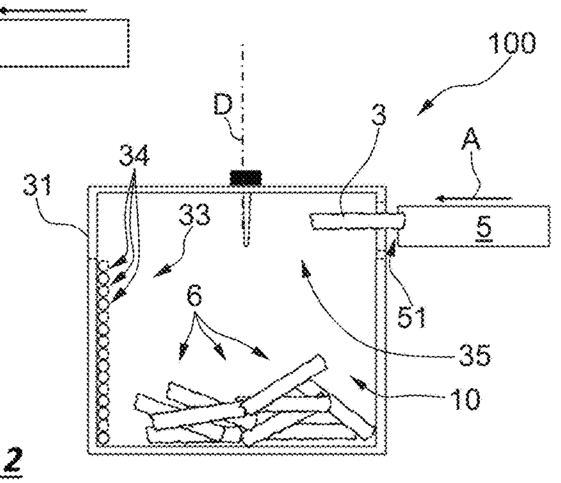

FIG. 1 a schematic side view of a cushion coiling system according an exemplary embodiment of the disclosure having a coiling device according to the disclosure in a closed state;

FIG. 2 schematic side view of the system according to FIG. 1 in an opened state;

FIG. 3*a* a schematic side view of a coiling device according an exemplary embodiment of the disclosure during the insertion of cushioning material towards the reel in a sectional view;

FIG. 3*b* a schematic frontal view of the cushioning device in the state according to FIG. 3*a;*

Figure 3C:
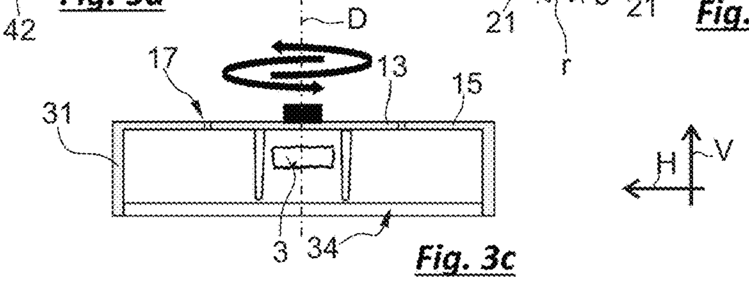
Figure 3D:
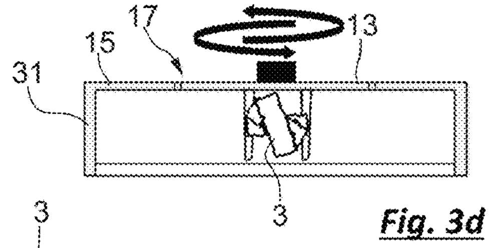
Figure 3E:
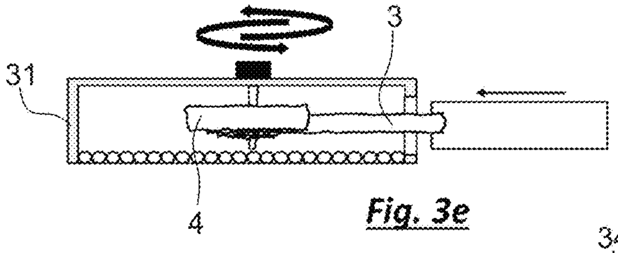
Figure 5:
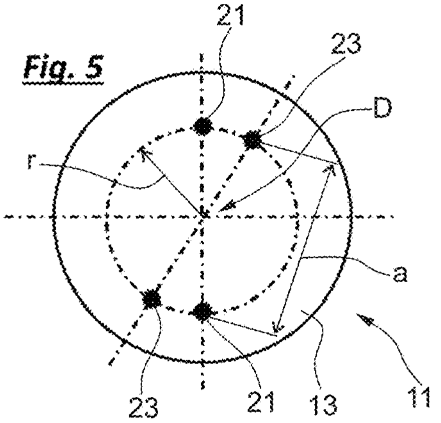
Figure 6:
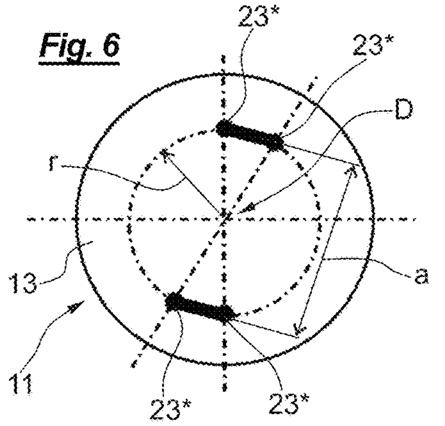
Figure 7:
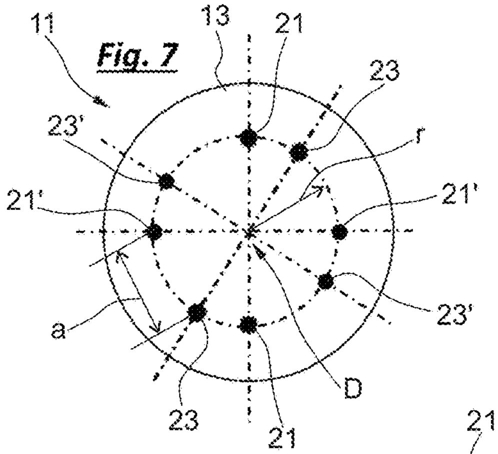
Figure 4:
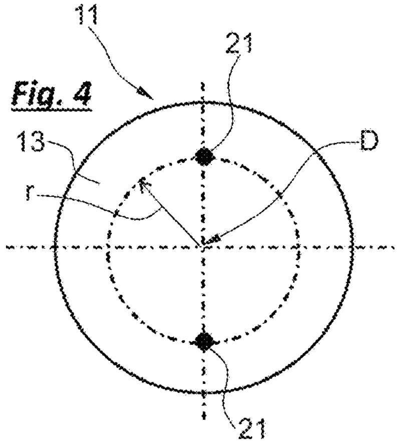
Figure 8:
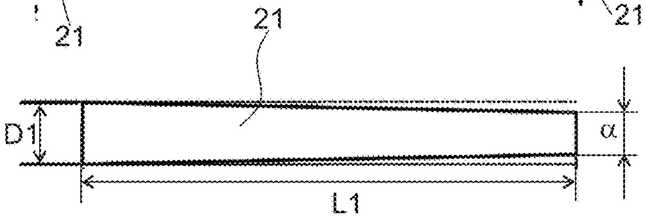
Figure 9D:
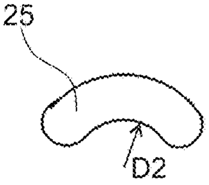
Figure 9C:
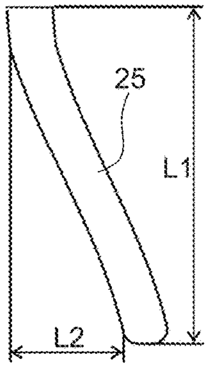
Figure 9B:
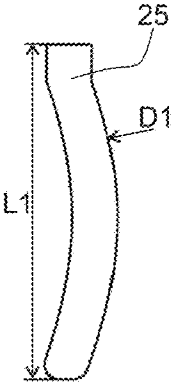
Figure 9A:
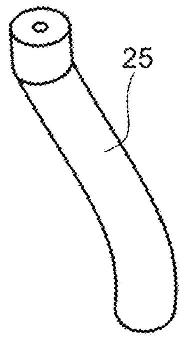
Figure 10:
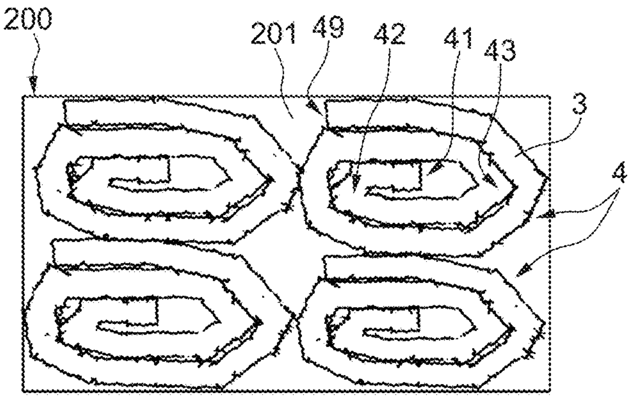
Figure 11:
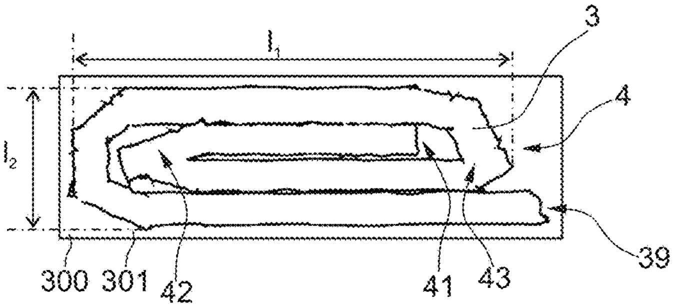
Figure 12:
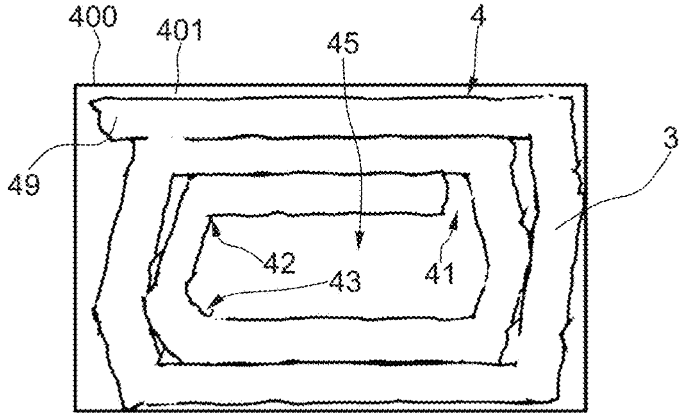
Figure 13:
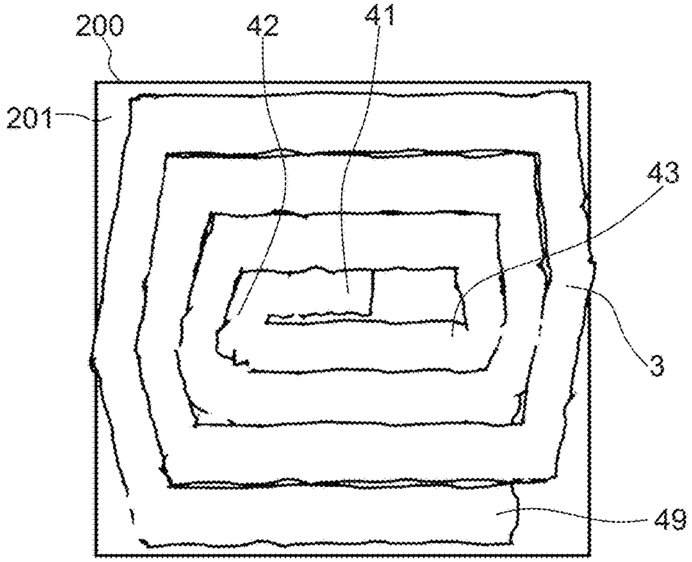

FIG. 3*c* a schematic frontal view of the coiling device according to FIG. 3*a* in the beginning of the rolling-up process;

FIG. 3*d* a schematic frontal view of the coiling device according to FIG. 3*a* upon initiation of the rolling-up process;

FIG. 3*e* a schematic side view of the coiling device according to FIG. 3*a* with a partially rolled-up cushioning spiral;

FIG. 4 a reel for a coiling device for example according to FIG. 1 or 3*a* with two diametrically opposite mandrels;

FIG. 5 a reel for a coiling device according an exemplary embodiment of the disclosure having four diametrically opposing pairs of deflector-mandrels;

FIG. 6 a reel for a coiling device having two deflector blades arranged opposite one another;

FIG. 7 a reel for a coiling device according an exemplary embodiment of the disclosure having eight concentrically aligned deflectors pairwise opposite one another;

FIG. 8 a schematic view of a truncated-cone-shaped mandrel for a reel of a coiling device according an exemplary embodiment of the disclosure;

FIGS. 9*a*-9*d* different perspective views of a deflector-hook for a coiling device according an exemplary embodiment of the disclosure;

FIG. 10 a schematic top view onto the bottom surface of a transport container covered with four cushioning spirals;

FIG. 11 a schematic top view onto a bottom surface of a rectangular cardboard box covered with a noncircular cushioning spiral;

FIG. 12 a schematic top view onto a bottom surface of a cuboid cardboard box partially covered with a toroidal and non-circular cushioning spiral; and FIG. 13 a schematic top view onto a bottom surface of a cuboid cardboard box covered with a con-circular cushioning spiral.

The exemplary embodiments of the present disclosure will be described with reference to the accompanying drawings.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

It is an objective of the disclosure to overcome the disadvantages of the prior art, and in particular to provide an improved alternative coiling device for spirally rolling-up a three-dimensional cushioning material which particular is safe, simple and quickly to operate preferably also by untrained personnel.

In accordance with the first aspect of the disclosure, a coiling device for a spirally rolling-up three-dimensional cushioning material made by a cushion forming device from a web-type source of material, in particular a roll or a Leporello-stack, for example of paper, is provided. The source material may be a paper material. Preferably, the source material is a recycling paper. A recycling paper consists of at least 50%, at least 60% or even at least 70% recovered paper. Such a source material is suitable for making a particularly environment friendly cushioning material. The cushioning forming device may for example be realized as one of the above-mentioned cushioning forming devices. The source material may be provided to the cushion forming device particularly as roll or as a Leporello-stack. The web-type source material has a first direction of longitudinal extension or conveying direction in relation to which the side edges of the source web material extend in parallel. The width of the web extends crosswise to the length of the web. In particular, the length of the web is substantially larger than the width of the web, for example at least 10 times or at least 100 times larger. The strength or thickness of the source material, which may be designated as a web thickness, is multiple times smaller than the width of the web and the length of another web. Generally, the web-thickness of a web-type source material, particularly paper, is less than 1 mm, preferably less than $2/10$ mm. The width of the web, that is the axial length of the roll or the width of the Leporello-stack, can lie between 100 mm and 1500 mm, in particular between 200 mm and 1000 mm, preferably between 250 mm and 900 mm.

For example a source material can be provided as a roll having an axial length at least half as large as its exterior diameter and/or having an axial length at least twice as large as its exterior diameter. Preferably, the ratio of axial length to exterior diameter of the roll may be larger than 0.75, in particular larger than 1, and/or smaller than 1.75 in particular 1.5. For example, the ratio of axial length to exterior diameter of the roll can be approximately 1.25. Preferably, the interior diameter of the roll in a novel state is smaller than half the exterior diameter. Preferably, the interior diameter in a novel state of the roll is larger than 1 cm, preferably larger than 5 cm, particularly preferred larger than 10 cm, and/or smaller than 25 cm, preferably smaller than 20 cm, particularly preferred smaller than 17.5 cm. For example, an interior diameter of a novel roll may be approximately 16 cm.

Alternatively, a substantial cuboid Leporello-stack may be provided as the source material. A particularly cuboid Leporello-stack defines an upper surface and a bottom surface between which the height of the stack extends (vertically). A single Leporello-stack may have a stack-height of 15 mm to 600 mm, particularly 100 mm to 300 mm, preferably 150 mm. A particularly cuboid Leporello-stack defines a length (in dispensing direction) from a front edge side to a rear edge side of the stack. A single Leporello-stack may have a length of 100 mm to 400 mm, in particular 250 mm to 350 mm, preferably 280 mm. A particularly cuboid Leporello-stack can have a stack-width (crosswise relative to the length or dispensing-direction and crosswise in relation to the height or vertical direction), extending between two opposite side edges of the Leporello-stack. The single Leporello-stack can have a stack-width of 200 mm to 500 mm, in particular 300 mm to 400 mm, preferably 350 mm. Preferably, the Leporello-stack comprises layers arranged on top of one another in a vertical direction, wherein in particular one layer of the stack may correspond to one sheet of the paper web. The edge sides of the Leporello-stack may be formed by folds of neighbouring layers of the paper web. The side faces can be formed by the lateral side edges of the paper web extending along the paper web.

Paper suitable as source material includes recycled paper, natron kraft paper and natron mixed paper. Paper source material can in particular have a grammage of at least 40 $g/m^2$ and/or at most 140 $g/m^2$ in particular at least 60 $g/m^2$ and/or at most 120 $g/m^2$. A paper source material can have a sheet thickness between 0.03 mm and 0.4 mm, in particular at least 0.06 mm and/or at most 0.25 mm. The source material can be single-ply, dual-ply or multi-ply. In particular, the source material contains cellulose fiber.

The particularly pillow- or hose-like three-dimensional cushioning material provided by the cushion forming device preferably has a width of 5 cm-50 cm, in particular 10 cm-30 cm, preferably a width of approximately 15 cm, and/or a length of 15 cm-300 cm, in particular 30 cm-150 cm, preferably 35 cm-75 cm, particularly preferred 40 cm. Cushioning material such as a cushioning pillow or a cushioning hose, in particular of paper, preferably of used paper or recycled paper, preferably has a density between 1 $kg/m^3$ and 100 $kg/m^3$, preferably between 3 $kg/m^3$ and 30 $kg/m^3$, in particular less than 20 $kg/m^3$, preferably less than 10 $kg/m^3$, particular preferred between 5 $kg/m^3$ and 8 $kg/m^3$ for example approximately 6.8 $kg/m^3$.

The coiling device in accordance with the disclosure comprises a reel with at least two carriers or deflectors, such as a mandrel, hook, deflector edge or the like. The deflector can be preferably attached to a bracket of the reel, for example a rotary disk, a hub, spokes or the like (symmetrically attached, in particular mirror-symmetrically and/or rotationally symmetrically). The deflectors of the reel turn about the rotational axis of the reel. The deflectors can have the same radial distance to the rotational axis of the reel. When performing a rotational movement about the rotational axis of the reel, the deflectors take along the cushioning material to be rolled-up. Thereby, the cushioning material is rolled-up from a, for example rectilinear, hose-shape to a, for example spiral-shaped, worm-form.

For example, the forward-end or front-end of the cushioning material directed in the conveying direction of the cushioning material may at first be guided through or threaded between the at least two deflectors or carriers. A rotational movement of the deflectors around the rotational axis can cause a carrying effect onto the cushioning material land through the area between the deflectors in the sense of rotation of the reel. While carrying the front-end of the cushioning material, the reel moves rotationally around the rotational axis which is arranged across relative to the cushioning material to be rolled-up. The deflectors of the reel take along the cushioning material at least sectionally in the sense of rotation of the reel.

For a reel with at least two deflectors, a first deflector can be attached to a bracket of the reel relative to the rotational axis opposite to a second deflector. The deflectors of the reel all have the same sense of rotation. One deflector moves with a radial distance towards the rotational axis round about around the rotational axis at least sectionally the rotational movement of the reel around the rotational axis takes place crosswise relative to the conveying direction of the cushioning material which is to be rolled-up, as well as crosswise relative to the longitudinal extension of the rotational axis.

An initial grabbing of the cushioning material can for example happen while two deflectors that are arranged diametrically opposite of one another relative to the rotational axis engage the cushioning material onto opposite sides of the cushioning material. For example, a first deflector of at least two deflectors can come into contact with the (left side or upper side) of the initial cushioning material and a second deflector can come into contact with the (right side or) the bottom side of the cushioning material. Following the engagement of at least two deflectors or carriers of the reel with two opposite sides of the cushioning material, at first a folding of the forward section of the hose-like cushioning material can be performed. For example, at first a contact of a forward-end of the cushioning material or its (left or) a lower side with a first deflector <and essentially> simultaneously a contact of the (right or) upper side of the cushioning material with a position trailing behind the forward-end can engage the contact with a second deflector can occur. Thereby, the first deflector can move in a clockwise and/or upward movement and the second deflector can be in a clockwise and/or downward movement, such that a folding of the frontal end of the packaging material (for example upwards) is performed (while the relatively further back part of the packaging material is conveyed for example downwards by the second deflector). After a first rotation of the reel of about 180° beginning with the engagement into contact of the deflectors and the cushioning material, the contact of the first deflector or the forward-end of the cushioning material held by it come into contact with a relatively further backwards-trailing position of the cushioning material. Simultaneously, the second deflector of the aforementioned trailing area of cushioning material, which lies between the frontal end the relatively further backward cushioning area, may be carried along in its rotational movement. At this point in time, the inner most spiral winding of the cushioning material worm may be formed. When the coiling device now rotates further, further cushioning material is rolled-up surrounding the aforementioned U-shaped folded forward section of the cushioning material, when thereby forming a cushioning spiral.

According to the first aspect of the disclosure, the rotational axis of the reel extends in vertical direction. Preferably, the rotational axis extends ideally vertical. It shall be clear, that the vertical direction means a direction defined by gravity or a direction essentially perpendicular on a preferably plane floor of a room, for example a commissioning center, where a packaging workspace is provided. It shall be clear that the extension of the rotational axis may deviate from an ideal orientation in the vertical direction and be at least essentially vertical, for example ±45° relative to the ideal vertical direction, ±30° offset relative to the vertical direction, ±15° offset relative to the vertical direction or ±5° offset relative to the vertical direction. The embodiment in accordance with the disclosure having a vertical rotational reel axis surprisingly permits numerous constructive design possibilities allowing a simpler, faster and safer usability of the calling device in comparison to the prior art. In accordance with a second aspect of the disclosure, which may be combined with the first aspect, a coiling device for spirally rolling-up a three-dimensional cushioning material is provided, which may be provided by a cushioning forming machine made from a web-type source material, in particular from a role or from a Leporello-stack, for example of paper. The cushion forming device, the three-dimensional cushioning material and/or the web-type source material may be configured as described above. Also the reel of the coiling device can be configured as described above. In accordance with the second aspect of the disclosure, the coiling device comprises a reel having more than two deflectors, such as mandrels, hooks, deflector edges or the like. For example, the reel can have three, four, six, eight, or more deflectors or carriers, which may be realized in particular as mandrels and/or hooks. It is also conceivable that the reel is provided with deflector-blades extending in the circumferential direction, forming respective deflector edge at their respective forward- and backward-end in the circumferential direction. A reel having two deflection blades would thus have four (two times two) deflector edges forming deflectors.

A deflector can be attached to the reel with a radial extension relative to the rotational axis. Preferably, at least several of the at least two deflectors according to the second aspect of the disclosure are arranged with the same radial distance to the rotational axis of the reel. According to the second aspect of the disclosure, the deflectors can be attached to the reel in a mirror- and/or rotationally symmetrical manner. The reel can comprise a bracket, such as a rotary plate, spokes, a hub or the like.

According to a preferred embodiment of a coiling device, the multiple, at least two or more than two, deflectors are arranged distributed around the rotational axis such that the coiling device rolls-up the three-dimensional cushioning material to a cushioning spiral having a non-circular in particular polygonal, preferably rectangular, circumferential shape. Alternatively or additionally the several, preferably at least two or more than two, deflectors, can in a preferred embodiment of the disclosure, be arranged distributed around the rotational axis, such that the coiling device rolls-up the three-dimensional cushioning material to a cushioning spiral having a radially inner cavity. Preferably, at least two of the more than two deflectors, in particular a pair of two deflectors each of the more than two deflectors, can be arranged in a pairwise manner diametrically opposite one another in relation to the rotational axis, fixed to a bracket of the reel. In particular, the coiling device comprises a reel with at least or more than two deflectors for rolling-up three-dimensional cushioning material in a non-circular spiral-shaped manner and/or for spirally rolling-up a toroid three-dimensional cushioning material preferably having a radially inner cavity. When a coiling device utilizes more than two deflectors, shapes deviating from a classical spiral worm form can be rolled-up. In particular, toroidal or annular bodies with a radially inner cavity can be created.

Therefore, while winding the forward-end and cushioning material hose it is inserted between at least two deflectors and carried along by them. During the further rotation of the reel, the cushioning material trailing with respect to the forward-end of the cushioning material hose runs along the outer circumference of the reel or along the other side of the deflectors, so that the space between the deflectors of the reel (apart from the forward end section of the cushioning material hose) remains essentially free of cushioning material and forms a radially inner cavity. A toroidal cushioning spiral is particularly suitable for cushioning transported good in a radial direction. For example, a toroid-shaped-liked rolled-up cushioning spiral having a radially inner cavity can be provided to be inserted into a container such as a cardboard box above a full-surface contact, spiral-one-shaped cushioning winding, such that the cushioning worm covers the floor of the cardboard box, the transporting good is placed on top of the cushioning worm and the cushioning toroid is inserted annularly surrounding the transporting good. Depending on the height of the transporting good, several cushioning spiral rings can be inserted to surround the transporting good along its height. On the upper side of the transporting good, for example, an additional cushioning worm can be placed. Alternatively or additionally, the coiling device can be configured to provide external, circumferential, non-circular spiral-shaped cushioning material. To this end, at least two deflectors of the reel can be attached to a bracket of the reel wherein the distance between the deflectors opposite one another is larger than, preferably at least twice as large as, in particular at least three times as large as, particularly preferably at least four times as large as the particularly maximum width of the cushioning material to be rolled-up. A non-circular spiral-shaped three-dimensional cushioning material can for example have a first longitudinal extension in the coiling plane, which may be at least 1.5 times as large as or at least two times as large as or larger than the second longitudinal extension perpendicular relative to the first longitudinal extension. Non-circular cushioning material is particularly suitable for filling containers, such as cardboard boxes having a surface to be cushioned, for example of a surface that has a shape significantly deviating from a circular shape, such as a rectangular shape.

According to a preferred embodiment of a coiling device according to the disclosure, the reel comprises a bracket realized as a preferably circular rotational plate to which the deflectors are fixed with a radial direction relative to the rotational axis. In particular, the at least two or more than two deflectors can be fixed with a constant radial distance relative to the rotational axis on the bracket. Preferably, the deflectors can be fixed to the bracket of the reel concentrically relative to the rotational axis. In this way, spirally shaped rolled-up cushioning material of constant quality and shape can be realized in a simple and fast way.

According to a preferred embodiment of a coiling device according to the disclosure, the deflectors are tapered for example conically in the direction of the rotational axis and/or a direction perpendicular relative to the bracket, preferably in the vertical direction, in particular downwards. A deflector can have a circumferential tapering crosswise relative to the direction of the rotational axis (the deflector may have two points offset in the direction of the rotational axis having different crosswise widths in the circumferential direction). A deflector can have a tapering in the radial direction crosswise relative to the direction of the rotational axis (that is, in two places offset in the direction of the rotational axis, the deflector has different crosswise widths in the radial direction relative to the rotational axis). For example, a mandrel-like deflector can be cone-shaped or shaped as a truncated cone. A configuration of cross-sectional tapering starting from the bracket of the at least two more deflectors simplifies the removal of a spiral-shaped rolled-up cushioning product from the reel without deformation. In particular in case such an embodiment of the deflectors is used in combination with a first aspect of the disclosure, wherein the rotational axis extends in the vertical direction, a configuration with tapering deflectors may be employed for mostly or fully automized coiling device from which rolled-up cushioning products are removable in an advantageous way without manual intervention after completion of the coiling process.

In accordance with the preferred embodiment of a coiling device according to the disclosure, at least one of the at least two or more than two deflectors is at least sectionally inclined relative to the direction of its longitudinal extension, in particular relative to the vertical direction and/or a direction-oriented perpendicular relative to the bracket, the deflector particularly having an inclination in the circumferential direction around the rotational axis, in particular having an angle of inclination of at least 5° and/or at most 45°, in particular at least 15° and/or at most 45°, preferably about 30°. The inclination is preferably provided beginning and the bracket towards the direction of the operationally intended direction of the rotational axis. It is conceivable that the deflector is curved in a hook-like manner, wherein a curvature in deviation relative to an ideal cylindrical shape as well as possibly a curvature realized at least sectionally as a slope may be provided. It has been shown that an inclination and/or curvature of deflectors may improve the carrying effect of a carrier, such that a particularly fast coiling process may be realized.

Alternatively or additionally, an at least sectional inclination of a carrier may provide an improved carrying effect that may for example be used for a denser winding. For example, a coiling device can rotate with a circumferential velocity of rotation at at least as fast as or faster than the conveying speed of the forming device so that the coiling device may exert tensile stress onto the part of the cushioning material hose to be rolled-up so that the windings can be formed fitting tightly to one another.

According to a third aspect of the disclosure, a coiling device for spirally rolling-up a three-dimensional cushioning material may be provided, which cushioning material may be made by cushion-forming device from a web-type sourced material, in particular a roll or a Leporello-stack for example of paper. Cushion forming device, source material, cushioning material and/or reel may be configured as described above. According to the third aspect of the disclosure, the coiling device comprises a housing surrounding the reel in the axial direction of the rotational axis on both sides. In particular, the housing may also surround the reel completely circumferentially in the radial direction. Preferably, the housing encompasses the reel in a closed state in the axial direction of the rotational axis on both sides at least extensively, preferably for at least about 30%, at least 50% or at least 70%. At least on one side a substantially complete surrounding may be provided by the housing, for example of at least 80%, in particular at least 90% of the surface spanned by the deflectors, preferably the surface spanned by the bracket, in particular spanned by the largest possible rollable cushioning spiral.

Housing sides surrounding the reel on both sides in the axial direction of the rotational axis are preferably at least as far apart from one another as the smallest or the largest cross-width of the cushioning material hose at the exit from the cushion forming machine. The distance between the housing sides opposite from each other in the axial direction of the rotational axis which surround the reel may preferably be smaller than five-times, preferably smaller than three times, particularly preferred smaller than twice the (maximal) width of the cushioning hose at the exit of the cushion forming device. The housing sides opposite from one another surrounding the reel may serve as a guide for the cushioning material to be rolled-up along its path from the exit of the cushion forming machine to the deflectors of the reel. The opposite housing sides surrounding the reel in the axial direction of the rotational axis on both sides may serve as an axial bearing for the cushioning material while rolling it up to a cushioning spiral, preferably as an axial sliding bearing, so as to provide a well-defined shape for the cushioning spiral which may include an inner cavity and/or which may be of non-circular circumference. The housing may stabilize and support the shaping effect of the coiling device. Furthermore, a housing surrounding the reel at least in axial direction as well as possibly in radial direction may provide an effective workplace-safety avoiding any injury of the user through the rotating reel. The third aspect of the disclosure may be combined with the first and/or second aspect.

According to a preferred embodiment of the disclosure in accordance with the first, second and/or third aspect of the disclosure, the at least two or more than two deflectors are attached to a bracket in the form of a rotary plate. In particular, the coiling device may comprise a cover plate surrounding the rotary plate in radial direction and/or horizontal direction. The cover plate may be provided with a recess for the rotary plate. Preferably, the rotary plate can be circular and be held in a circular recess of the cover plate, which in particular is essentially complementary in shape to the rotary plate. Between the cover plate and the rotary plate, a radially extending annular slot may be formed. The recess in the cover plate can extend through the cover plate or be inserted into the cover plate in a pocket-like manner. The cover plate can provide an axial sliding bearing for the cushioning spiral during the rolling-up process, preferably on the drive-side of the reel or on the side on which the bracket of the reel is firmly attached to a driving shaft or the like. The bracket, in particular the rotary plate, as well as the cover plate radially surrounding the bracket, may form part of the housing surrounding the reel, for example in two axial directions.

According to a preferred embodiment of a coiling device according to the disclosure, a support surface for the cushioning material and/or a cushioning spiral is arranged vis-à-vis the reel, in particular vis-à-vis in the axial direction of the rotary axis and/or vertically below the bracket of the reel to which at least two or more than two deflectors are attached. The support surface may in particular be arranged vis-à-vis a rotary plate that may preferably be surrounded by a cover plate. The support surface may realize the housing side opposite the reel surrounding the reel in a first axial direction of the rotational axis. The support surface may serve as a sliding bearing for the cushioning material to be rolled-up and/or, particularly during the rolling-up procedure for the cushioning spiral.

In accordance with the preferred further development of the disclosure, the support surface may be displaceable between a closed position for the rolling-up process or for winding the cushioning spiral from the cushioning material, and an open position for accessing the reel and/or for dispensing the cushioning spiral, in particular in a trap-door-like manner, a sectional-gate-like manner, a rolling-shutter-like manner or a in any similar way. The support surface may for example be pivoted, tilted, distanced, translationally in a crosswise direction relative to the rotary axis or be moved in any other way.

The support surface may be made of multiple movable bodies which may be movable in different directions during the change of the support surface between the close position and the open position. For example, a support surface may comprise two or more trap doors foldable in two different directions. A rolling-shutter-like or sectional-gate-like support surface may comprise multiple blade-like-support bodies having a main direction of extension and which are connected to one another crosswise relative to the main direction of extension, in order to be displaceable along a curved path, rails or the like in a rolling-shutter-like manner be rolled-up, during a movement crosswise relative to their main direction of extension (and crosswise relative to the direction of the rotary axis). The movement of a support surface opposite the reel allows for a simple and safe access to the preferably stagnant reel of the coiling device in particular for removing a rolled-up cushioning spiral. In one embodiment with a support surface vertically below the bracket, the support surface may serve as a safety against cushioning material falling out vertically in the direction of gravity; and in the opened position the removed support surface may allow for the finished cushioning spiral to fall off. In such a case, it may be preferred that a reception and/or storage-container for multiple cushioning spirals is provided on the side of the support surface opposite to the reel. A reception- and/or supply-container allows the production of multiple cushioning spirals as a supply without forcing the operator to remove each individual cushioning spiral from the reel by hand. A certain supply of cushioning spirals may ascertain that during the filling procedure of the transport container sufficient cushioning material may always be provided so that idle times of the packaging personnel can be avoided.

In a preferred further development of a coiling device of the disclosure, the support surface may comprise a multitude of rotatable bearing members such as bearing cylinders, bearing balls or the like. By providing the support surface with rotatable bearing members, the cushioning material and/or the cushioning spiral may move along the bearing members, preferably, move along the bearing members vertically on top of them, wherein in the place of sliding friction at least sectionally rolling friction may be present.

The bearing members may comprise parallel as well as at least partially coaxial axes of rotation. The bearing member may have axes arranged in a star-shaped or radial-spoke-like-manner relative to the rotary axis of the coiling device.

The disclosure further relates to a cushion coiling system comprising a coiling device such as described above, in particular according to the first, second and/or third aspect of the disclosure. The cushion coiling system further comprises a cushion forming machine for making a cushioning material from a web-type-source-material, in particular from a roll or from Leporello-stack, for example of paper. The cushion-forming machine of the cushion coiling system comprises a discharge opening at which the cushioning material leaves the cushion forming device preferably hose-like in a discharge direction. Preferably, the discharge direction extends in axial direction. In particular, the discharge direction of the discharge opening is directed towards a conveying path which crosses the rotary axis of the coiling device or which at least leads into an area between two carriers or deflectors of the coiling device opposite one another. The cushion coiling system is free of any guiding device for guiding the cushioning material in the radial direction crosswise relative to the rotary axis of the reel in the area between the cushion coiling machine, in particular the discharge opening of the cushion forming machine, and the reel, in particular the area spanned by the deflectors during a rotation about the rotary axis. A known coiling device has shown that a for instance a beak-like guide extending from the cushion forming device to the reel realizes a particularly critical source of error, because any cushioning material that was folded or rolled-up by 180° is turned against the beak-guide which may cause paper to jam. By omitting any guiding device for guiding the cushioning material in the radial direction across the rotary axis of the reel, the source of error present in the prior art can be avoided. Safely guiding the cushioning material from the discharge opening of the cushion forming device can nevertheless be provided a safe and high-quality manner, when a coiling device is for example realized in accordance with the first aspect of the disclosure having a vertical rotary axis and having a guiding bridge in the area between the cushion forming device and the reel, vertically below the cushioning material, in axial direction of the rotary axis vertically below the coiling plane. A guiding bridge can, for example, be realized as part of a coiling device housing, for example by means of a cover plate or a support surface. Other arrangements devoid of any guiding means are conceivable, for example, the cushion forming machine may be arranged vertically above the coiling device and discharge the cushioning material in the direction of gravity vertically downwards, so that due to the effect of gravity, a guiding means can be omitted.

According to a preferred further development of the cushion coiling system according to the disclosure, said system can be configured to selectively dispense either a particularly strip- or pillow-shaped cushioning material, or a cushioning spiral. The cushion coiling system can have a spiral cushion producing state and a different state for strip- or pillow-production. With such a cushion coiling system, it is possible to selectively provide either pillow- or strip-shaped, or spiral-shaped cushioning products, or any combination thereof. Preferably, the cushion coiling system can be configured to be operated to switch between a spiral cushion coiling state and a pillow cushion production state.

In the following description of different embodiments, some of which may be combined, the same or similar reference numerals are used for the same or similar component for ease of intelligibility. A coiling device according to the disclosure is generally designated with reference numeral 1. The coiling system according to the disclosure is generally designated with reference numeral 100. The central components of the coiling system 100 are a cushion forming device 5 which is configured to make a three-dimensional cushioning material from a web-type source material, and a coiling device 1 which rolls-up the cushioning material provided by the cushion forming device 5 into a spiral shape.

As a cushion forming device 5, the devices zoned under the trade name "PaperJet" or "SpeedMan" by the applicant shall be taken into consideration, in particular, such as described in the aforementioned publications. As a source material for forming a cushioning material in particular a paper web material shall be taken into consideration, which may for example be stored as a role or as a leporello-stack.

The web-type or web-shaped source material generally has a longitudinal dimension which is several orders of magnitude larger than the crosswise dimension (width). The crosswise dimension of the source material is several orders of magnitude larger than the strength or thickness of the source material. The strength of the source material is smaller than 1 millimeters. The width of the source material is at least several centimeters and at most few meters. The longitudinal extension of the source material is more than 10 meters, preferably more than 50 meters, in particular more than 100 meters. The source material can comprise several layers or plies of web material.

A deformation of the web-type source material into a three-dimensional cushioning material takes place within the cushion forming device. The cushion forming device may in particular create a hose-like cushioning material such as described above from the web-type cushioning material. During the forming or deforming of the source material to a cushioning material within the cushion forming device, cushioning material is made having a crosswise width reduced in relation to the crosswise width of the source material and having a height substantially larger than the strength of the source material. The height and the width of the cushioning material after the deformation in the cushion forming machine are essentially of the same order of magnitude. Preferably, the height of the cushioning material is at least ⅕, in particular at least ½ of the width of the cushioning material and/or at most 5-times preferably at most twice, the width of the cushioning material. Width and height of the cushioning material are preferably several centimeters each. The deformation within the cushion forming device preferably happens continuously so that a hose-like cushioning material is made from the web-type source material, wherein the longitudinal extension of the cushioning material essentially corresponds to the longitudinal extension of the source material, apart from contractions going along with deformation.

The cushion forming device 5 dispenses or discharges the cushioning material 3 at the discharge opening 51 in a discharge direction A. Preferably, the cushion forming device 5 can be arranged and its dispenser 51 oriented such that the discharge direction A is performed essentially in a horizontal direction H. As can be seen for instance in FIGS. 1, 3*a* and 3*b*, the discharge direction A of the discharge opening 51 is oriented in a radial direction R relative to the rotary axis D of the coiling device 1 which shall be described below. The dispensing of cushioning material 3 from the cushion forming device 5 occurs in a vertical direction V approximately in the height of the reel 11 of the coiling device 1. The coiling device 1 may be free of any guiding means for guiding the cushioning material 3 from the discharge opening 51 of the cushion forming device 5 to the reel 11 of the coiling device 1 in the crosswise direction horizontally relative to the discharge direction A. Between the cushion forming machine 5 and the reel 11, the cushioning material 3 may be conveyed on a support surface 33 to the reel 11, for example slide along or roll along the support surface. The cushioning material moves beginning at the cushion forming device 5 to the reel 11 essentially in a horizontal plane.

The horizontal plane on which the cushioning material 3 is guided from the cushion forming device 5 to the reel 11 can correspond to the coiling plane in which, as described in further detail below, a cushioning spiral 4 or a cushioning worm is rolled-up by the coiling device 1 from the cushioning material.

A coiling device 1 according to FIGS. 1, 2 and 3*a* through 3*e* comprises a reel 11 having two deflectors that may be realized as prongs, studs or mandrels 21. The mandrels 21 are connected to a rotary plate 13 in a torque-proof manner, such as shown in FIG. 4. The rotary plate 13 has a circular cross-section with a circle-radius larger than the distance r of the mandrels 21 to the rotary axis D of the reel 11.

The cushioning material 3 dispensed from the cushion forming device 5 has a crosswise width b and a height h. Subsequently, the width b designates the larger one of the dimensions crosswise in relation to the lengthwise direction of the cushioning material. The distance a between the carriers, such as the mandrels 21, of the reel 11 preferably corresponds to two times of the radius r in which the mandrels 21 are distanced from the rotary axis D, and the distance a is at least as large as the width b of the cushioning material 3. The distance a between two carriers of the reel 11 adjacent to one another in the circumferential direction of the reel 11 may preferably be smaller than three times, in particular smaller than twice, particularly preferred smaller than 1.2-fold of the width b of the cushioning material 3.

As can be seen in FIGS. 3*a* and 3*b*, the cushioning material 3 which is dispensed from the cushion forming device 5 in the discharge direction a is threaded between two adjacent carriers, such as mandrels 21, of the reel 11. In FIG. 3*a*, the forward end 41 of the cushioning material 3 is positioned shortly before threading between the carriers of the reel 11. The forward end 41 of the cushioning material 3 is guided between two adjacent carriers in the discharge direction A for threading. The threading-conveying can occur at least as long as it takes until the forward end 41 of the cushioning material 3 is moved so far past the rotary axis d of the reel 11 that the forward end 41 of the cushioning material 3 is distanced by at least the smallest radial distance r of a carrier of the reel from the rotary axis thereof.

After threading the cushioning material 3 into the reel 11, the reel 11 can be driven for rolling-up a cushioning spiral 4. When the reel 11 is operated and driven, an engine causes a rotation of the carriers, for example the mandrels 21 shown in FIGS. 1 through 4, about the rotary axis D. In the embodiments according to FIGS. 1 through 4, the carrier-mandrels 21 are connected to a carrier-plate 13 in a torque-proof manner, which is rotary driven by a schematically indicated driving kinematic that may comprise a driving engine and a driving shaft. The reel 11 is rotatable relative to the housing 31 of the coiling device 1 and relative to the cushion forming device 5.

When the reel 11 is driven, the carriers rotate, at least part of which realize the deflector, around its rotational axis D. During the rotation of the carriers around the rotary axis D, the carriers come into a contacting engagement with the threaded cushioning material 3 to be rolled-up, such as shown in FIG. 3*d*. When the cushioning material 3 is different width- and height-dimensions, it is possible, that due to the contact of the carriers to the cushioning material 3, at first a torsional rotation of the cushioning material 3 about its longitudinal axis ensues, so that the wider width-wise dimension [width b] of the cushioning material becomes aligned in parallel relative to the longitudinal extension of the carriers. In the embodiment according to FIGS. 1 through 3*e*, the carriers extend in vertical direction V. The cushioning material is, as described above, dispensed from the cushion dispensing device 5 in a horizontal direction h in the dispensing direction a and has at its exit 51 a width b extending crosswise relative to the dispensing direction in the horizontal direction h; as well as a height or cushioning-strength a extending in the vertical direction V. During the initiation of the coiling process according to FIG. 3*d*, the cushioning material 3 is at first twisted around its longitudinal axis so that the larger crosswise width b of the cushioning material becomes aligned in the vertical direction V corresponding to the mandrels 21.

In the embodiment shown in FIGS. 1 through 4 of the cushioning device 1 having a reel 11 with two carrier-mandrels 21, upon initiation of the coiling process, one carrier-mandrel 21 will come into a contact engagement with the cushioning material 3 close to its forward end 41 and cause a deflection of the forward end of the cushioning material 3 into a first crosswise direction, for example horizontally h towards the right relative to the dispensing direction a. A further carrier-mandrel 21 will come into contacting engagement with an area 42 trailing behind the forward end 41 of the cushioning material 3 and cause a deflection of this point 42 of the cushioning material 3 into an opposite crosswise direction, for example towards the left in relation to the dispensing direction a.

The carrier-mandrels 21 of the reel 11 at first perform a rotation about 180° around the rotational axis d until the forward end section 41 of the cushioning material 3 comes into contact engagement with a position 43 of the cushioning material 3 further behind in relation to the trailing position 42 in the dispensing direction a. At this point in time, after a first 180° rotation of the carrier in contact engagement with forward end 41 of the cushioning material 3, the cushioning material 3 is rolled-up into a U-shaped cushioning sausage. When the cushioning device 11 rotates the reel 11 further about its rotational axis d, further windings of the subsequent strand of cushioning material are rolled-up around the U-shaped cushioning sausage. This way, a cushioning spiral 4 is made. The number of windings of the cushioning spiral 4 can be arbitrarily set. It has been shown, that a U-shaped cushioning sausage as described above can be seen as a beginning cushioning spiral. Each single winding of the cushioning spiral 4 corresponds to performing rolling-up of about 360° or any multiple of 360° of the forward end 41 of the cushioning material 3. Preferably, the cushioning spiral 4 comprises approximately 1.5 windings (see FIG. 11), approximately 2 windings, approximately 3.5 windings (FIG. 13) or more windings.

Preferably, the coiling device or the coiling system can be provided with control electronic b configured to begin and/or stop the rolling-up process in accordance with a control setting, such that preferably a cushioning spiral of predetermined size, for example of a predetermined volume, of a predetermined length of cushioning material and/or having a predetermined number of winding is made. The rolling-up process can for example be ended by manual or automated separation of a trailing end 49 of the cushioning spiral 4 or the cushioning material 3.

As shown in FIGS. 1 and 3*a* through 3*e*, the rotary axis D of the reel 11 of the coiling device 1 extends in the vertical direction, preferably exactly vertically. The rolling-up process or coiling process may occur within a housing 31 of the coiling device. The housing 31 can be made of a rotary plate 13 and be limited by a cover plate 15 surrounding the rotary plate 13 in horizontal as well as radial direction. The cover plate 15 may preferably comprise a throughlet opening 17 or a blind-hole-like pocket (not shown in further detail) for receiving the rotary plate 13 or any other bracket of the reel 11. The reception 17 in the cover plate 15 can preferably be dimensioned such that there is always an annular hole between the bracket that may for example be formed as a rotary plate 13 and the cover plate 15 in the radial direction.

In the axial direction of the rotary axis D opposite to the bracket which is here shown as a rotary plate 13 for example and the cover plate 15, the housing 31 of the coiling device 1 may comprise a support surface 33. In the embodiment shown in FIGS. 1, 2 and 3*a* through 3*e*, the support surface 33 consists of rolling-shutter- or sectional-gate-like connected bearing cylinders 34. The bearing cylinders 34 are mounted to the housing 31 in particular rotatable about their cylinder bearing axis. The bearing cylinders extend in parallel to one another. The bearing cylinder axes extend in the horizontal direction crosswise relative to the dispensing direction A. The width of the bearing cylinders 34 crosswise relative to the dispensing direction A in the horizontal direction essentially corresponds to the inner width of the housing 31. When the cushioning material 3, such as shown in FIG. 3*a*, is dispensed from the cushioning forming device 5 in the dispensing direction A, it may be guided along on top of the upper side of the support surface 33. For example, the cushioning material 3 may be guided rolling over the bearing cylinders 34 to the reel 11.

During the coiling process shown in FIGS. 1 and 3*e*, the support surface 33 makes sure that the cushioning spiral 4 cannot fall off the reel 11 downwards in the vertical direction V. The parts of the housing 31 opposite one another in the axial direction of the rotational axis D which are in this case formed on one hand by the support surface 33 and on the other hand by the cover plate 15 and the rotary plate 13 limit the coiling plane. Surrounding the reel 11 in the radial direction r there are further housing walls extending between the axial limiting signs of the housing 31. At least one housing wall is in contact with the cushion forming device 5 and/or has an entry opening for cushioning material 3. The housing 31 provides a safe protection against intentional or unintentional excess of the user into the area of the rotating reel 11.

When a cushioning spiral 4 is rolled-up to a sufficient, particularly predefined size, the support surface 33, as shown in FIG. 2 schematically, may be driven from the closed state shown in FIG. 1 into an open position in which it allows access to the reel 11. When the support surface 33 is not in its open position, the cushioning spiral 4 can be removed from the reel 11, slide down, fall or be removed by other means. For example, it is possible to provide a supply container 10 within the coiling device 1 vertically below the reel 11, in which several cushioning spirals 4, such as shown in FIG. 1, can be stored. The coiling device 1 is preferably configured such that, in relation to the closed position of the support surface 33*a* supply container 10 is provided opposite the reel, such that in the open position of the support surface 33, a cushioning spiral 4 or a cushioning material 3 can move into the area of the supply container 10 for the area of the exit and/or the coiling plane through the released opening 35.

As shown in FIG. 2, it is conceivable that the coiling system 100, is provided with one preconfigured setting according to which cushioning material 3 for instance in the form of a cushioning pillow or cushioning hose 6 can be dispensed directly from the cushion forming machine 5 into the supply container 10.

The carrier-mandrels 21 of the coiling device 1 can be set into a passive state in the open position, can for example be turned off or blocked. The control electronics of the coiling system 100 can for example be configured to selectively cause either a cushioning pillow production state or a cushioning spiral production state, wherein the coiling system 100 makes cushioning pillows 6 in the cushioning pillow production state, and wherein the cushioning system 100 makes a cushioning spiral 4 in the cushioning spiral production state. The provision can occur via a supply container 10. It is conceivable that the control electronics of the cushioning system 100 are configured to selectively provide an arbitrary number of cushioning pillow 6 and an arbitrary number of cushioning spirals 4. For example, the control electronics of the coiling system 100 can be configured to provide an operator-selected number of cushioning pillows and upon an operator-selected number of cushioning spirals 4, wherein the control electronics may cause the coiling system 100 to automatically switch from the cushioning pillow production state into the cushioning spiral production state or vice versa.

Referring to FIGS. 1 and 2 the support surface is as one example moved from the closed position, which the bearing cylinders 34 of the support surface 33 form a horizontal plane, moved in a sectional gate-type manner, such that the bearing cylinders 34 of the support surface 33 no longer limit the housing 31 opposite the reel 11 but rather release an opening 35 within the housing 31.

The support surface 33 is moved into the opened state on the inside of the supply container 10 and the opened state shown in FIGS. 1 and 2, so that the bearing cylinders 34 defines a vertical plane. The rotational axes of the bearing cylinders 34 are arranged in parallel, vertically above one another.

FIGS. 4 through 7 show different reels. In FIG. 1, the reel 11 comprises a simple, fully circular rotational plate 13 of a bracket, on which carrier-mandrels 21 are provided diametrically opposite one another in relation to the rotary axis D. The carrier-mandrels 21 are arranged on a concentrically circumferential path around the rotary axis D with a constant radius r. Each mandrel 21 acts as a deflector.

FIG. 5 shows a different reel 11 going to diametrically opposite carrier-mandrel-pairs. All mandrels 21, 23 have the same radial distance r relative to the rotary axis D. The circumferential distance between the two mandrels 21, 23 of a pair of mandrels lies in the area between 10° and 40°, preferably about 30°. A reel in accordance with FIG. 5 can be used to roll-up a non-circular cushioning spiral (for example in accordance with FIG. 11).

FIG. 6 shows a different reel, in which the carriers are realized at deflector edges 23* of deflector blades. The deflector blades are arranged on a circumferential path with a radial distance r in relation to the rotary axis D. The reel 11 according to FIG. 6 can be used to roll-up cushioning spiral which are very similar to the ones that can be rolled-up with the reel 11 according to FIG. 5. The deflector blades of the reel according to FIG. 6 are carrier-mandrel-pairs 21, 23 of the reel 11 according to FIG. 5 are arranged in a distance a from one another at least as large as the width b of the cushioning material to be rolled-up. A further embodiment of the reel 11 is shown in FIG. 7. The reel according to FIG. 7 comprises four pairs of deflector-mandrels that are arranged in pairs opposite one another. Between two pairs of mandrels a distance a is provided which is at least as large as the width of the cushioning material. The distance between two mandrels 21, 23 or 21', 23' of one respective pair is smaller than the distance A between the two adjacent pairs. All mandrels 21, 21', 23, 23', lie on the same concentrically circumferential path with distance r from the rotary axis D. Using the reel of FIG. 7, the toroidal cushioning spiral having an inner cavity, such as shown in FIG. 12, may be rolled-up. In the inner cavity of the cushioning spiral lies essentially only the forward end 41 of the cushioning spiral 4, which is initially threated into the reel 11 correspondingly to the rolling-up process shown in FIGS. 3*a* to 3*e*. The cushioning material 3 trailing in the conveying direction behind the forward end 41 of the cushioning material 3 behind the first deflection 43, runs along the exterior circumference on the mandrels 21, 23, 21', 23' during coiling, or along the outside of the previous first, second or further winding.

An exemplary geometry of a carrier-mandrel 21 is shown in FIG. 8. The carrier-mandrel has a length L1 which in the mounted state extends parallel to the rotary axis D of the reel 11. Preferably, the length L1 is at least as large as the width b of the cushioning material. Preferably, the length L1 of the carrier-mandrel 21 may be sized such that in the closed state of the housing 31, it extends from one axial housing inner side to the opposite housing inner side. Preferably, the length L1 of one carrier-mandrel is at least 60%, at least 75% or at least 85% of the distance from the first axial inner side of the housing 31 to opposite second axial side of the housing 31. The mandrel 21 may, such as shown in FIG. 8, be truncated-coat-shaped having a wide basis with a diameter of 0.1 cm to 3 cm and a cone-angle α between 1° and 15°, preferably between 1° and 5°, and in particular between 2° and 3°.

FIGS. 9*a* through 9*d* show a different perspective of a carrier-hook 25. Different from the previously described carrier-mandrel 21, the carrier-hook 25 has a shape different from a rotational cylindrical longitudinal extension. The hook 25 has an inclination which in the mounted state of the hook extends preferably in the circumferential direction of the reel 11. The forward end of the hook is distanced by a forward length L2 from its trailing mounting end, at which the hook 25 is attached to the bracket, in particular the rotary plate 13 of the reel 11. In relation to the axis of inclination which may preferably be arranged in parallel to the rotary axis D of the reel 11, the hook 25 has a curvature with a radius of curvature D2. The same can be applied as mentioned above in regard to the axial longitudinal extension L1 of the carrier-mandrel 21. The diameter D1 of the carrier-hook 25 may be essentially constant along its longitudinal extension L1 or have a tapering in at least one section.

FIG. 10 shows a cardboard box-like transport container 200 having a bottom surface 201 which is for the most part covered by the cushioning spiral 4. The production of the cushioning spiral 4 may have been performed as shown above in reference to FIGS. 3*a* through 3*e* with a reel according to FIG. 4. FIG. 13 shows the cuboid transport container 200 having one single, non-circular, hexagonal cushioning spiral 4 having two longer and 2×2 shorter sides.

FIG. 11 shows a different, longitudinally-rectangular transport container 300 having a bottom surface of 301 covered with a singular, non-circular cushioning spiral 4. The non-circular cushioning spiral 4 according to FIG. 11 has a first longitudinal width of extension L1 in the coiling plane which is at least twice as large as the second longitudinal extension L2 in particular in relation to the first longitudinal extension L1, also in the spiral plane. Such a non-circular cushioning spiral 4 may be created with the reel according to figure or FIG. 6. It is also conceivable that a reel having a basic design such as in FIG. 4 but with a radial distance of the carrier-hooks 25 relative to the rotary axis D much larger than the width b of the cushioning material 3 that may be used for the creation of a non-circular cushioning spiral 4.

FIG. 12 shows an almost cuboid container 400 having a bottom surface 401 which is covered by a toroidal cushioning spiral or cushioning spiral ring 4 on an annular section thereof. The toroidal cushioning spiral 4 according to FIG. 12 leaves a radial inner cavity 43 having a cross wide width in any direction of the spiral plane much larger than the width b of the cushioning material 3.

The features disclosed in the above description, the figures and the claims may be of relevance for the realization of the disclosure in its different embodiments alone as well as in any combination thereof.

LIST OF REFERENCE NUMERALS

1 coiling device
3 cushioning material
4 cushioning spiral
5 cushion forming device
6 cushion pillow

10 supply container
11 reel
13 rotary plate
15 cover plate
17 recess
21, 23 mandrel
25 hook
31 housing
33 support surface
34 bearing cylinder
41 front end
42 trailing point
43 further lagging point
49 trailing end
51 discharge opening
100 coiling system
200 container
201 ground surface
300 container
301 ground surface
400 container
401 ground surface
A discharge direction
D rotational axis
H horizontal direction
L1 longitudinal extension
R radial direction
V vertical direction
a distance
b cross-width
h height
l1, l2 longitudinal width
r radius

The invention claimed is:

1. A coiling device for spirally rolling-up a three-dimensional cushioning material made by a cushion forming device from a web-type source material, comprising:

a reel having a rotational axis extending in a vertical direction, and at least two deflectors arranged with respect to the rotational axis and configured to roll-up the three-dimensional cushioning material; and a housing surrounding the reel fully circumferentially in a radial direction and on both sides in an axial direction of the rotational axis in a closed state.

2. The coiling device according to claim 1, wherein the reel includes more than two deflectors.

3. The coiling device according to claim 1, wherein the at least two deflectors are arranged around the rotational axis such that the coiling device is configured to:

roll-up the three-dimensional cushioning material forming a noncircular shaped cushioning spiral, and/or roll-up the three-dimensional cushioning material to form a radially inner cavity.

4. The coiling device according to claim 1, wherein the reel comprises a bracket to which the deflectors are attached with a constant radial distance relative to the rotational axis and/or concentrically.

5. The coiling device according to claim 4, wherein a support surface for the cushioning material is arranged in a vertical direction below the bracket, the bracket including a rotary plate.

6. The coiling device according to claim 5, wherein the support surface is configured to be displaceable between a closed position for rolling-up the cushioning material to form a cushioning spiral of the cushioning material, and an open position for accessing the reel and/or for discharging the cushioning spiral.

7. The coiling device according to claim 5, wherein the support surface comprises multiple rotatable bearings.

8. The coiling device according to claim 4, wherein the bracket is a circular rotary plate.

9. The coiling device according to claim 4, wherein the deflectors are tapered in a direction perpendicular relative to the bracket.

10. The coiling device according to claim 1, wherein the deflectors are tapered in a direction of the rotational axis.

11. The coiling device according to claim 1, wherein:

the deflectors are at least sectionally arranged inclined relative to a direction of respective longitudinal extensions of the deflectors, the deflectors are arranged with an inclination aligned in a circumferential direction relative to the rotational axis, an angle of inclination of the deflectors being at least 5° and/or at most 45°.

12. The coiling device according to claim 1, wherein the at least two deflectors are attached to a bracket formed as a rotary plate, the coiling device having a cover plate surrounding the rotary plate in a radial direction and/or in a horizontal direction, wherein the cover plate has a recess for the rotary plate.

13. The coiling device according to claim 1, wherein the web-type source material is a roll of paper.

14. The coiling device according to claim 1, wherein the web-type source material is a Leporello-stack of paper.

15. A cushion coiling system comprising:

a coiling device according to claim 1; and a cushion forming device configured to make a cushioning material from a web-type source material, wherein the cushion forming device comprises a discharge opening at which the cushioning material leaves the cushion forming device in a discharge direction, wherein the cushion coiling system is free of any guiding device for guiding the cushioning material in the radial direction crosswise to the rotational axis of the reel between the cushion forming device and the reel.

16. The cushion coiling system according to claim 15, wherein the cushion coiling system is configured to selectively discharge a strip-shaped or pillow-shaped cushioning material or a cushioning spiral.

17. A coiling device for spirally rolling-up a three-dimensional cushioning material made by a cushion forming device from a web-type source material, comprising:

a reel having a rotational axis extending in an axial direction, and at least two deflectors arranged with respect to the rotational axis and configured to roll-up the three-dimensional cushioning material around the at least two deflectors to form a cushion around the at least two deflectors; and a drive configured to drive the reel to roll-up the three-dimensional cushioning material around the at least two deflectors.

18. The coiling device according to claim 17, wherein the at least two deflectors extend parallel to the axial direction of the rotational axis and each of the at least two deflectors are spaced from the rotational axis in a radial direction.

19. A coiling device for spirally rolling-up a three-dimensional cushioning material made by a cushion forming device from a web-type source material, comprising:

a reel having a rotational axis extending in an axial direction, and at least two deflectors arranged with respect to the rotational axis and configured to roll-up the three-dimensional cushioning material around the at least two deflectors to form a noncircular-shaped and planar curved-shaped cushioning spiral around the at least two deflectors.

20. The coiling device according to claim 19, wherein a dimension of the cushioning spiral in a first radial direction is greater than a dimension of the cushioning spiral in a second radial direction perpendicular to the first radial direction, the axial direction being perpendicular to the first and the second radial directions.

* * * * *